(12) United States Patent
Hirano et al.

(10) Patent No.: US 10,083,380 B2
(45) Date of Patent: Sep. 25, 2018

(54) INFORMATION PROCESSING APPARATUS, INFORMATION PROCESSING METHOD, COMPUTER PROGRAM PRODUCT, AND IMAGE FORMING APPARATUS

(71) Applicants: Masanori Hirano, Kanagawa (JP); Toshihito Kamei, Tokyo (JP)

(72) Inventors: Masanori Hirano, Kanagawa (JP); Toshihito Kamei, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/568,160

(22) PCT Filed: Apr. 21, 2016

(86) PCT No.: PCT/JP2016/002129
§ 371 (c)(1),
(2) Date: Oct. 20, 2017

(87) PCT Pub. No.: WO2016/170787
PCT Pub. Date: Oct. 27, 2016

(65) Prior Publication Data
US 2018/0144218 A1    May 24, 2018

(30) Foreign Application Priority Data

Apr. 22, 2015 (JP) ................................ 2015-087913

(51) Int. Cl.
B41J 2/155    (2006.01)
G06K 15/10    (2006.01)
(Continued)

(52) U.S. Cl.
CPC ............ G06K 15/1823 (2013.01); B41J 2/04 (2013.01); B41J 2/155 (2013.01); B41J 2/2132 (2013.01);
(Continued)

(58) Field of Classification Search
CPC ... B41J 2/04; B41J 2/155; B41J 2/2132; B41J 2/2139; B41J 11/42; B41J 29/393;
(Continued)

(56) References Cited

U.S. PATENT DOCUMENTS 5,889,537 A * 3/1999 Shimada .............. G06K 15/105
347/41
5,946,011 A * 8/1999 Kanaya ................ G06K 15/107
347/14

(Continued)

FOREIGN PATENT DOCUMENTS

EP    2 641 739 A1    9/2013
JP    11-320858       11/1999
(Continued)

OTHER PUBLICATIONS

International Search Report dated Jul. 19, 2016 in PCT/JP2016/002129 filed on Apr. 21, 2016.

(Continued)

Primary Examiner — Anh T. N. Vo
(74) Attorney, Agent, or Firm — Harness, Dickey & Pierce, P.L.C.

(57) ABSTRACT

A calculating unit calculates, as a reference number N of scans, a sum by adding 1 to a product M of the number m of scans in a main-scanning direction and the number n of scans in a sub-scanning direction. An assigning unit assigns, as a count of scans indicating a scan order, an integer 1 or more and the product M or more to each pixel of a unit image. A changing unit changes the count of scans of some pixels to which a first scan is assigned to an N-th scan. The generating unit generates print data, in which nozzle groups from a nozzle group arranged on a downstream end in the sub-scanning direction to a nozzle group arranged on an upstream end are sequentially assigned to pixels from the
(Continued)

pixels to which the first scan is assigned to the pixels to which the N-th scan is assigned.

6 Claims, 9 Drawing Sheets

(51) Int. Cl.
  *G06K 15/02* (2006.01)
  *B41J 2/04* (2006.01)
  *B41J 2/21* (2006.01)
(52) U.S. Cl.
  CPC ....... *G06K 15/105* (2013.01); *G06K 15/1836* (2013.01); *G06K 15/1851* (2013.01); *G06K 2215/101* (2013.01)
(58) Field of Classification Search
  CPC .. G06K 15/102; G06K 15/105; G06K 15/107; G06K 15/1823; G06K 15/1836; G06K 15/1851; G06K 2215/101
  See application file for complete search history.

(56) References Cited

U.S. PATENT DOCUMENTS

| | | | |
|---|---|---|---|
| 6,203,134 B1 | 3/2001 | Kakutani et al. | |
| 6,247,788 B1 | 6/2001 | Kamei | |
| 6,302,517 B1* | 10/2001 | Kanaya | B41J 2/15 347/16 |
| 6,443,554 B1* | 9/2002 | Yoshida | B41J 2/15 347/41 |
| 2003/0052941 A1 | 3/2003 | Sato et al. | |
| 2006/0071995 A1 | 4/2006 | Hayashi et al. | |
| 2006/0227160 A1* | 10/2006 | Takahashi | G06K 15/102 347/15 |
| 2007/0046706 A1* | 3/2007 | Kayahara | B41J 2/2128 347/14 |
| 2009/0179935 A1 | 7/2009 | Otokita | |
| 2010/0079527 A1 | 4/2010 | Sanada | |
| 2010/0182367 A1 | 7/2010 | Takagi et al. | |
| 2012/0147082 A1 | 6/2012 | Takagi et al. | |
| 2012/0154477 A1* | 6/2012 | Yamazaki | B41J 2/2139 347/19 |
| 2013/0265367 A1 | 10/2013 | Kaneko et al. | |

FOREIGN PATENT DOCUMENTS

| | | |
|---|---|---|
| JP | 2010-082933 | 4/2010 |
| JP | 2014-156063 | 8/2014 |

OTHER PUBLICATIONS

Extended European Search Report dated Mar. 2, 2018 issued in corresponding European Application No. 16782809.4.

* cited by examiner

[Fig. 1]
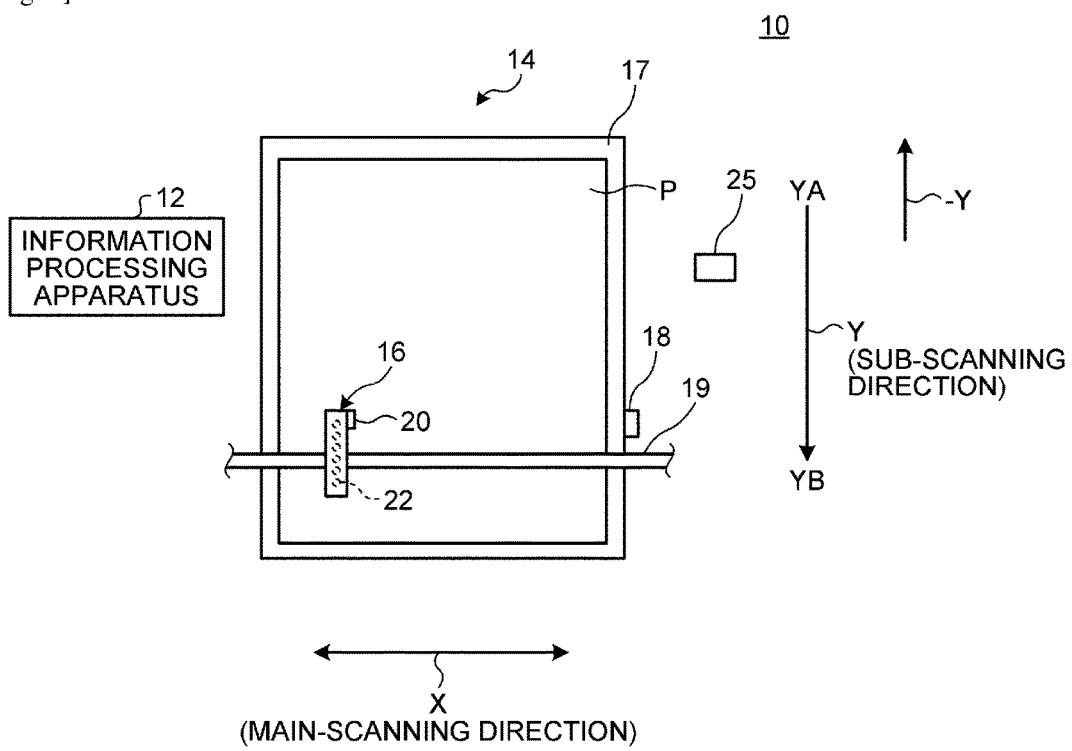
[Fig. 2]
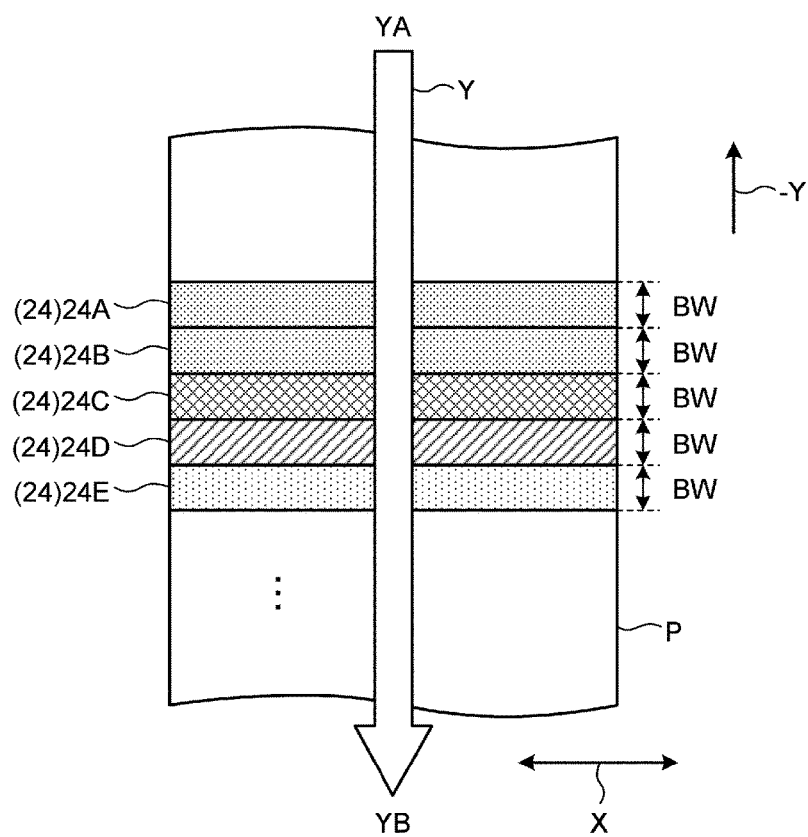

[Fig. 3]
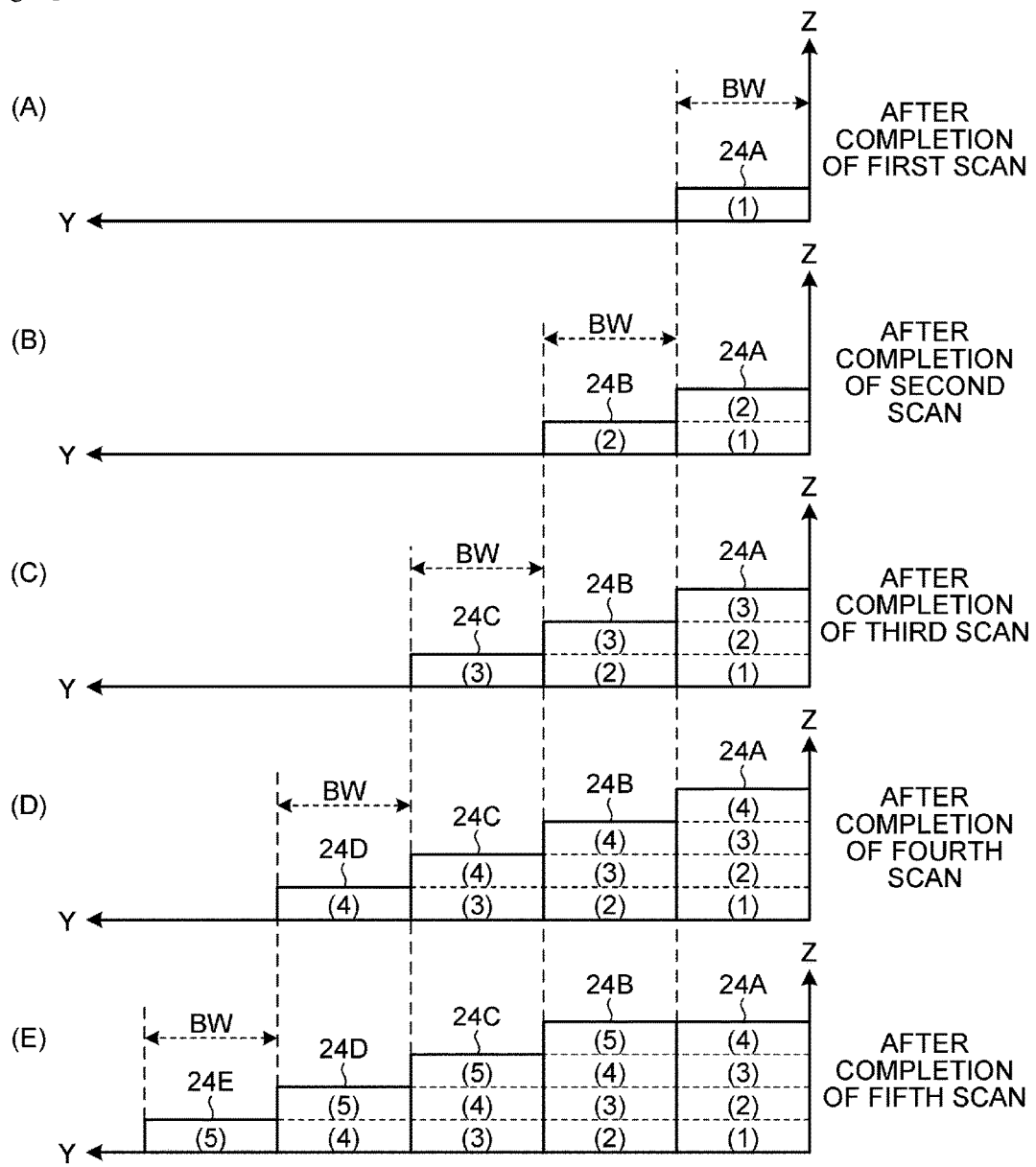

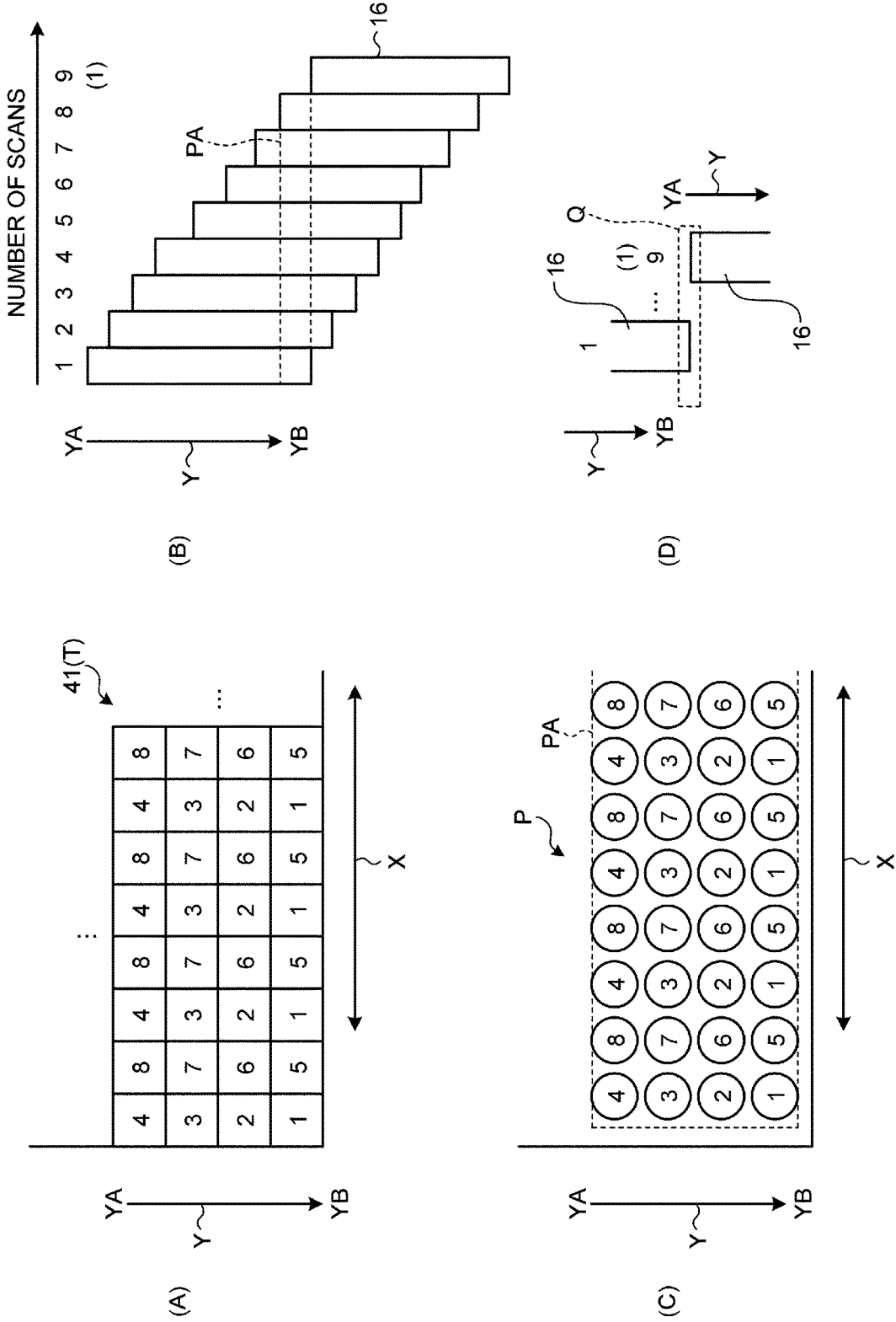
[Fig. 4]

[Fig. 5]
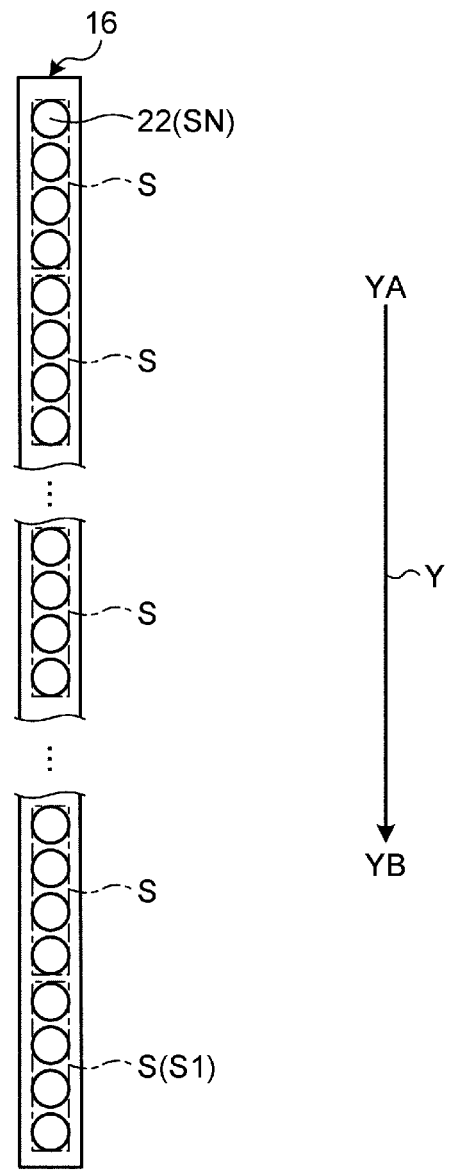

[Fig. 6]
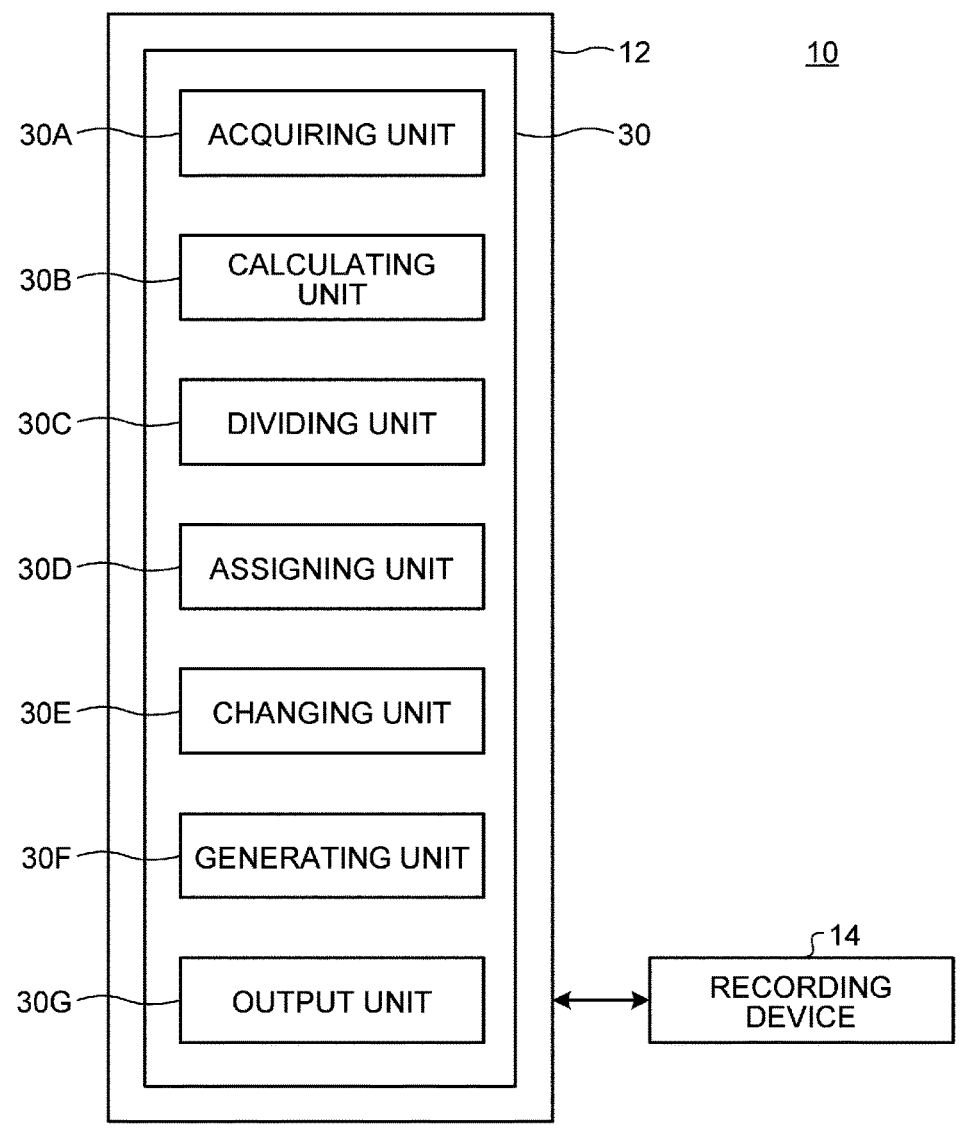

[Fig. 7]
(A)
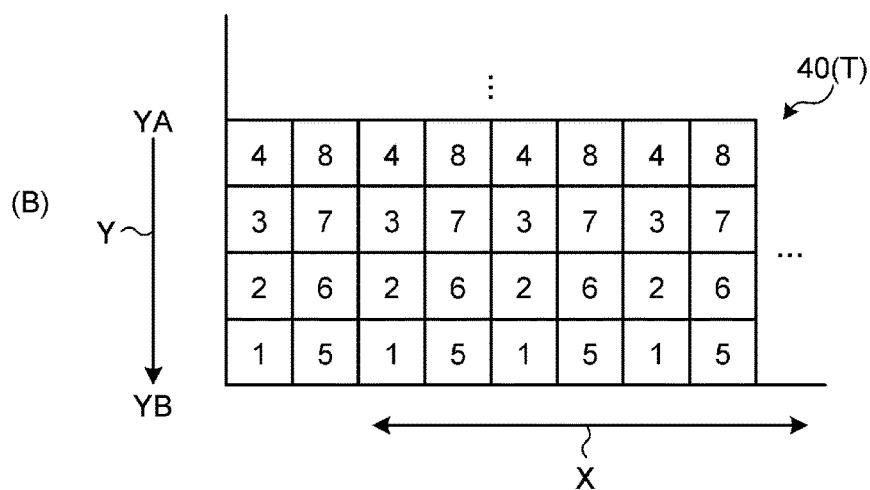
(B)
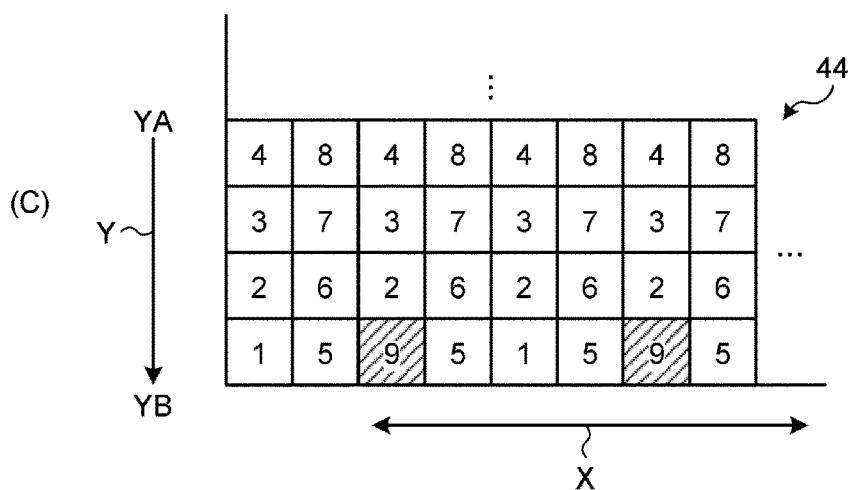
(C)

[Fig. 8]
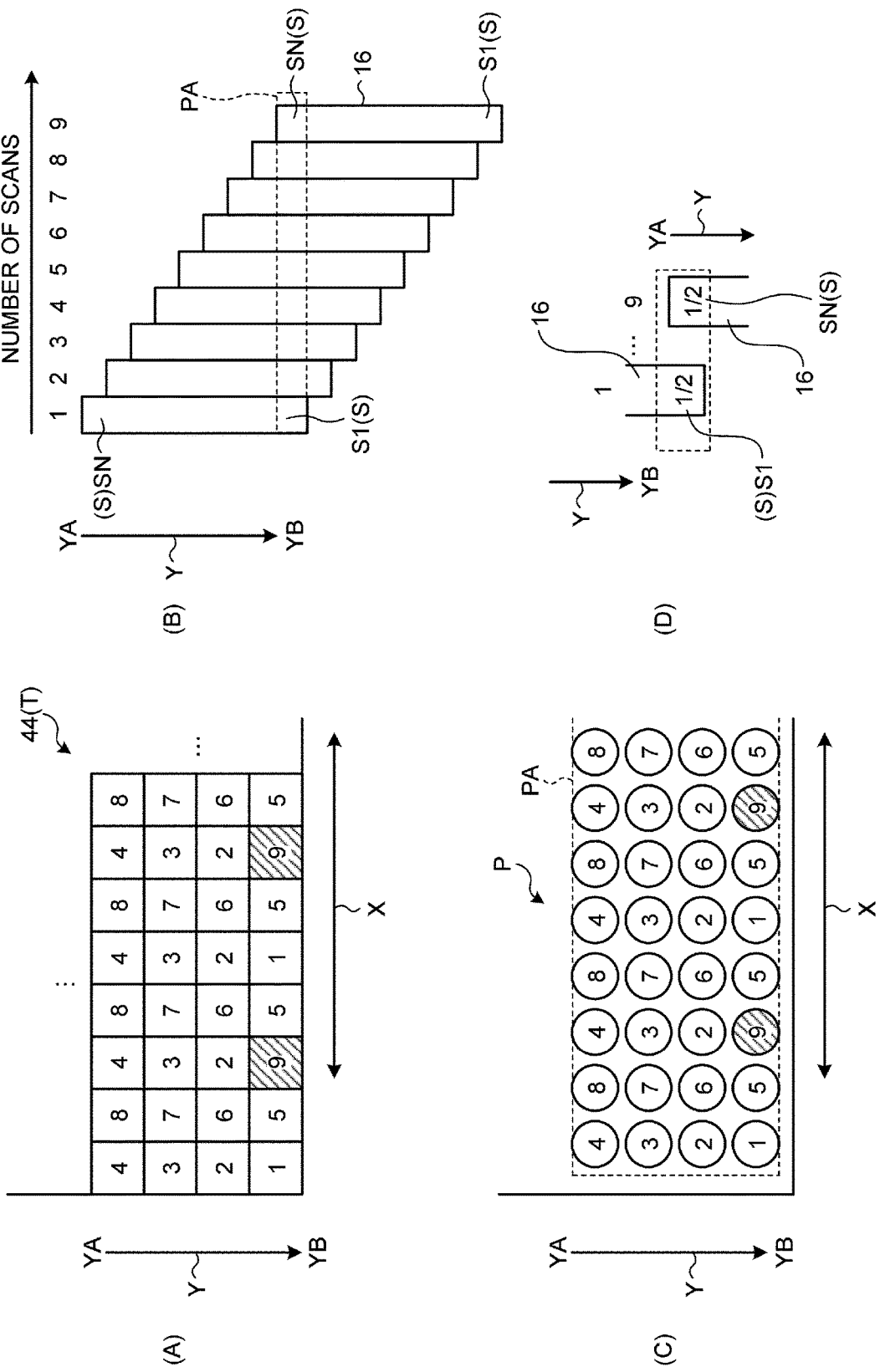

[Fig. 9]
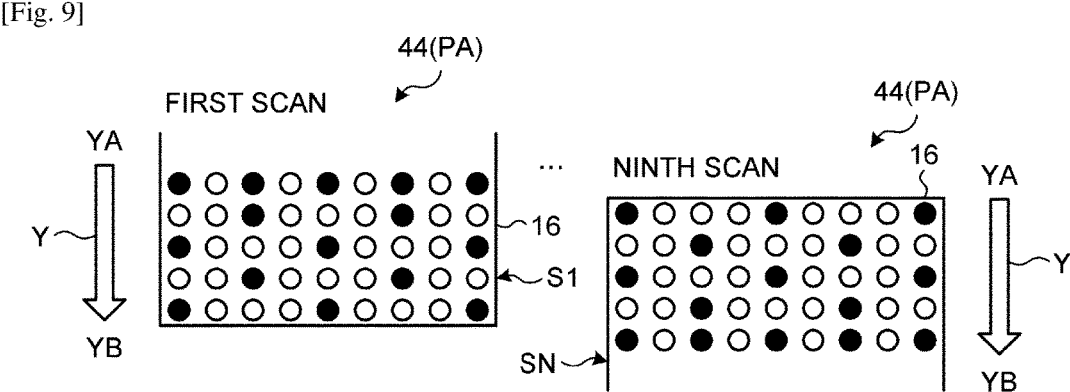
[Fig. 10]
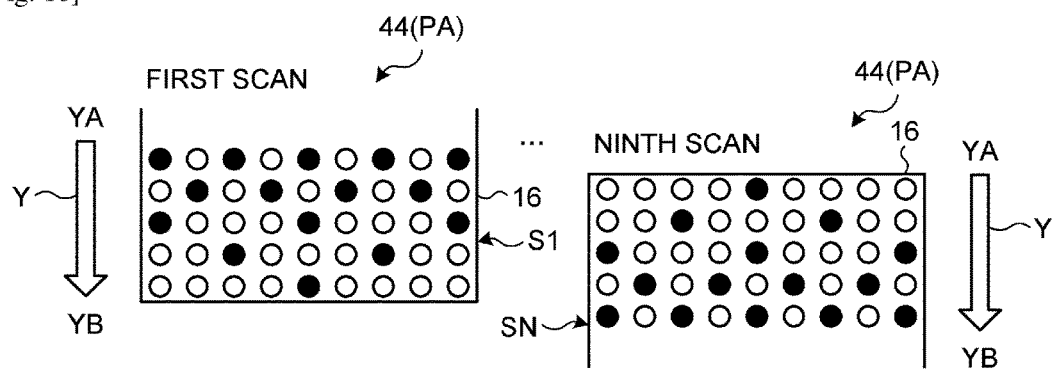

[Fig. 11]
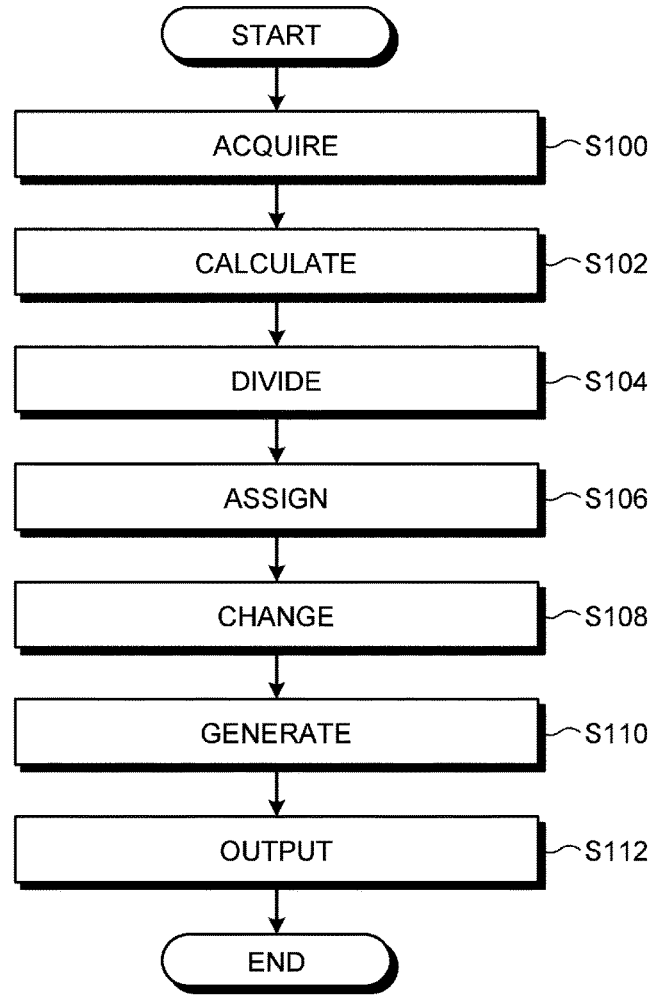
[Fig. 12]
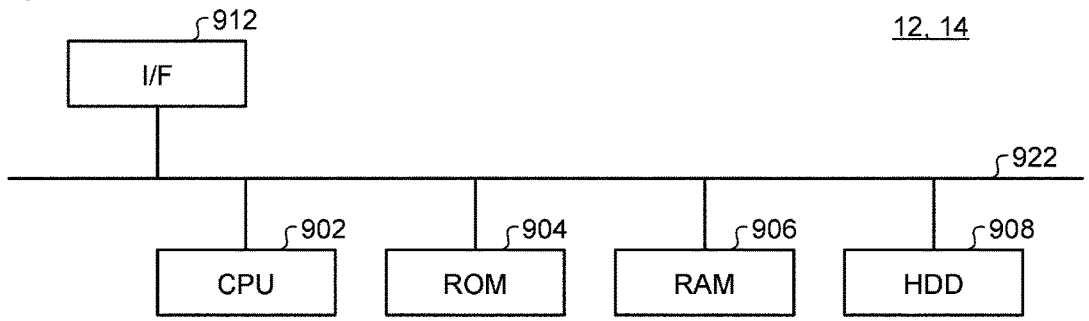

INFORMATION PROCESSING APPARATUS, INFORMATION PROCESSING METHOD, COMPUTER PROGRAM PRODUCT, AND IMAGE FORMING APPARATUS

CROSS-REFERENCE TO RELATED APPLICATIONS

This application is a national phase under 35 U.S.C. § 371 of PCT International Application No. PCT/JP2016/002129 which has an International filing date of Apr. 21, 2016, which claims priority to Japanese Patent Application No. 2015-087913, filed Apr. 22, 2015, the entire contents of each of which are hereby incorporated by reference.

TECHNICAL FIELD

The present invention relates to information processing apparatuses, information processing methods, computer program products, and image forming apparatuses.

BACKGROUND ART

There has been known a recording device that forms an image by ejecting droplets, such as ink, from a nozzle. In the recording device, a multipath system is known, in which a recording head including a nozzle for ejecting ink is moved in a reciprocating manner in a main-scanning direction relative to a recording medium and the recording medium is relatively moved in a sub-scanning direction to form an image.

However, in the multipath system, the recording head repeatedly scans the same area on the recording medium, so that a recording speed decreases. To improve the productivity, it is necessary to reduce the number of scans; however, image degradation is increased with a decrease in the number of scans. As a technology for suppressing image degradation, for example, a technology is disclosed in which a print mask with different arrays of mask values for determining ejection or non-ejection of ink is adjusted to each of blocks that are obtained by dividing a plurality of nozzles disposed on a recording head, and print data is generated by using the mask values.

SUMMARY OF INVENTION

Technical Problem

However, conventionally, it is difficult to improve a printing speed and suppress image degradation at the same time.

Solution to Problem

According to an embodiment, an information processing apparatus includes an acquiring unit, a calculating unit, a dividing unit, an assigning unit, a changing unit, and a generating unit. The acquiring unit acquires image data of an image to be formed by a recording device. The recording device includes a recording including a plurality of nozzles that are arranged in a sub-scanning direction and that eject droplets to record dots; a sub-scanning unit that causes the recording head to scan in the sub-scanning direction relative to a recording medium; and a main-scanning unit that causes the recording head to scan in a reciprocating manner in a main-scanning direction crossing the sub-scanning direction. The recording device alternately repeats a scan in the main-scanning direction and a scan in the sub-scanning direction when recording the dots. The calculating unit calculates, as a reference number N of scans in a recording area on the recording medium corresponding to a unit image that is obtained by dividing the image in the sub-scanning direction, a sum by adding 1 to a product M of a number m of scans in the main-scanning direction and a number n of scans in the sub-scanning direction that are needed to record the image with a recording target resolution. N is an integer equal to or greater than 5, m is an integer equal to or greater than 2, and n is an integer equal to or greater than 2. The dividing unit divides the image data into a plurality of unit images in the sub-scanning direction such that each unit image includes a certain number of pixels whose number in the sub-scanning direction corresponds to the number of the nozzles that are arranged in the sub-scanning direction in each of nozzle groups. The nozzle groups are obtained by dividing a nozzle array of a plurality of the nozzles arranged in the sub-scanning direction by the reference number N of scans in the sub-scanning direction. The assigning unit assigns, as a count of scans indicating a scan order for recording, an integer equal to or greater than 1 and equal to or smaller than the product M to each of pixels belonging to the unit image for each of the unit images. The changing unit changes the count of scans of some of pixels to which a first scan is assigned as the count of scans to an N-th scan equal to the reference number of scans, for each of the unit images. The generating unit generates print data, in which nozzle groups from a nozzle group arranged on an end of a downstream side in the sub-scanning direction of the recording head to a nozzle group arranged on an end of an upstream side in the sub-scanning direction are sequentially assigned, as the nozzle group for recording dots corresponding to each pixel, to pixels from the pixels to which the first scan is assigned as the count of scans to the pixels to which the N-th scan equal to the reference number of scans is assigned, for each of the unit images.

Advantageous Effects of Invention

According to an embodiment, it is possible to generate print data capable of improving a printing speed and suppressing image degradation at the same time.

BRIEF DESCRIPTION OF DRAWINGS

FIG. 1 is a diagram illustrating an example of an image forming apparatus.
FIG. 2 is a top view illustrating a state in which five scans are performed by a multipath system.
FIG. 3 is a side view illustrating a cross-sectional structure of FIG. 2.
FIG. 4 is a diagram for explaining image formation using conventional print data.
FIG. 5 is an enlarged schematic view of a recording head.
FIG. 6 is a functional block diagram of the image forming apparatus.
FIG. 7 is a diagram for explaining generation of print data.
FIG. 8 is a diagram for explaining image formation using print data of an embodiment.
FIG. 9 is a diagram for explaining image formation using the print data of the embodiment.
FIG. 10 is a diagram for explaining image formation using the print data of the embodiment.
FIG. 11 is a flowchart illustrating the flow of information processing.
FIG. 12 is a hardware configuration diagram.

DESCRIPTION OF EMBODIMENTS

Exemplary embodiments of an information processing apparatus, an information processing method, an information processing program, and an image forming apparatus will be described in detail below with reference to the accompanying drawings.

FIG. 1 is a diagram illustrating an example of an image forming apparatus 10.

The image forming apparatus 10 includes an information processing apparatus 12 and a recording device 14. The information processing apparatus 12 and the recording device 14 are communicably coupled to each other.

The recording device 14 includes a recording head 16, a sub-scanning unit 18, a main-scanning unit 20, and a control unit 25. The recording head 16 includes a plurality of nozzles 22. The nozzles 22 are arranged along a sub-scanning direction Y. The recording head 16 is an inkjet-type recording head, and ejects droplets from each of the nozzles 22 to record dots. Droplet ejection ports of the nozzles 22 are arranged on the recording head 16 so as to face a platen 17 on which a recording medium P is placed.

The sub-scanning unit 18 causes the recording head 16 to scan in the sub-scanning direction Y relative to the recording medium P. In the embodiment, the sub-scanning unit 18 conveys the recording medium P in an opposite sub-scanning direction −Y in order to cause the recording head 16 to scan in the sub-scanning direction Y relative to the recording medium P. Incidentally, the sub-scanning unit 18 may move the recording head 16 to scan in the sub-scanning direction Y.

The main-scanning unit 20 causes the recording head 16 to scan in a reciprocating manner in a main-scanning direction X. The main-scanning direction X is a direction crossing the sub-scanning direction Y. It is preferable that the main-scanning direction X is perpendicular to the sub-scanning direction Y. The recording head 16 is supported by a supporting unit 19 elongated in the main-scanning direction X, and the main-scanning unit 20 causes the recording head 16 to reciprocate in the main-scanning direction X along the supporting unit 19.

The control unit 25 controls each of the units of the recording device 14. The control unit 25 is electrically coupled to the main-scanning unit 20, the sub-scanning unit 18, and the like. The control unit 25 receives print data from the information processing apparatus 12. The control unit 25 ejects droplets from the nozzles 22 in accordance with the print data to thereby record dots and form an image on the recording medium P. At the time of recording the dots, the control unit 25 controls the sub-scanning unit 18 and the main-scanning unit 20 such that the recording head 16 alternately repeats a scan in the main-scanning direction X and a scan in the sub-scanning direction Y.

That is, the recording device 14 of the embodiment is the recording device 14 using a multipath system. The multipath system is a system of forming an image by causing the recording head 16 to reciprocate in the main-scanning direction X relative to the recording medium P while relatively moving the recording medium P in the sub-scanning direction Y.

With use of the multipath system, it is possible to form an image with a high resolution that exceeds a limit of a density of the nozzles 22 of the recording head 16 and a limit of a drive frequency needed to eject droplets from the recording head 16. Furthermore, with use of the plurality of the nozzles 22 for recording per unit area, it is possible to distribute ejection deviation of each of the nozzles 22, a variation in an ejection amount of droplets, a variation in a feed amount of the recording medium P for each scan, or the like.

An image forming method using the multipath system will be described below. FIG. 2 is a top view illustrating a state in which five scans are performed by the multipath system, and FIG. 3 is a side view illustrating a cross-sectional structure of FIG. 2. In the examples illustrated in FIG. 2 and FIG. 3, to simplify the explanation, the number of scans in each of the sub-scanning direction Y and the main-scanning direction X with respect to a single recording area is group to "2" (a total of four scans).

The plurality of the nozzles 22 arranged in the sub-scanning direction Y are divided into and handled as, for example, four nozzle groups in the sub-scanning direction Y. Each of the nozzle groups records dots corresponding to a single scan. An area in which the dots are recorded by a single scan is a belt-like area corresponding to a moving amount of a single scan in the sub-scanning direction Y (hereinafter, may be referred to as a bandwidth BW). In a first scan to a third scan, the nozzle groups are sequentially driven starting from the nozzle group that corresponds to the first scan and that is disposed on an end of a downstream side YB in the sub-scanning direction Y, in accordance with a recording start position in the sub-scanning direction Y. From a fourth scan to a V-3 scan (V corresponds to a last scan), all of the four nozzle groups record dots in a single scan. From a V-2 scan to a V-th scan, inversely with the first scan to the third scan, the drive of the nozzle groups is sequentially stopped starting from the nozzle group on the downstream side YB in the sub-scanning direction Y, in accordance with a recording end position in the sub-scanning direction Y. In the recording area scanned four times, a complete image is formed.

Specifically, as illustrated in FIG. 2 and FIG. 3, if the first scan is completed, a dot (1) is formed by the first scan in a recording area 24A corresponding to the recording start position in the sub-scanning direction Y. Subsequently, the recording head 16 moves in the sub-scanning direction Y, so that a scanning position of the recording head 16 is moved by the bandwidth BW in the sub-scanning direction Y with respect to the recording medium P, and dots (2) are formed by the second scan in the recording area 24A and a recording area 24B. Thereafter, in each scan, the scanning position of the recording head 16 is moved by the bandwidth BW in the sub-scanning direction Y with respect to the recording medium P, and dots (3) and subsequent dots are recorded in each of recording areas 24. By performing scans four times, an image in the recording area 24 is completed. For example, when a fifth scan is completed as illustrated in FIG. 2 and FIG. 3, images in the recording area 24A and the recording area 24B are completed.

The number of scans that are needed to form an image with a recording target resolution in the single recording area 24 on the recording medium P is determined based on a drive frequency needed to eject droplets from the recording head 16, an arrangement pitch of the nozzles 22 on the recording head 16, or the like.

Specifically, it is assumed that the pitch of the nozzles 22 adjacent to each other in the sub-scanning direction Y on the recording head 16 is 300 dpi. In this case, if dots with a resolution of 1200 dpi are to be recorded in the sub-scanning direction Y, at least four scans are needed in the sub-scanning direction Y.

Furthermore, the drive frequency needed to eject droplets is different depending on a driving system (for example, a piezoelectric type or a thermal type) that causes the nozzles 22 to eject droplets or depending on the structure of the nozzles 22. By increasing the drive frequency as much as possible, it is possible to reduce the number of scans in the main-scanning direction X needed to form an image with the recording target resolution.

Incidentally, while it is desired to record a higher quality image at a higher speed, an increase in the density of the nozzles 22 is limited. Therefore, it is attempted to increase the number of scans in the sub-scanning direction Y and increase the drive frequency as much as possible to thereby decrease the number of scans in the main-scanning direction X.

However, an increase in the drive frequency is also limited. Furthermore, in view of improving image quality by distributing variations in the ejection characteristics of the respective nozzles 22, it is preferable that the number of scans in the main-scanning direction X is at least two. However, when only the number of scans in the main-scanning direction X is simply set to the minimum value, that is, two scans, an effect of the distribution of variations in the ejection characteristics is low and image degradation occurs, which makes it difficult to increase the number of scans and form an image at a high speed at the same time.

FIG. 4 is a diagram for explaining image formation performed by the recording device 14 by using conventional print data.

For example, it is assumed that the number of scans (hereinafter, referred to as a product M) that are needed to record an image with the recording target resolution in a single recording area PA (see (C) of FIG. 4) on the recording medium P is eight (eight scans, which is derived from a product "8" of 4×2 based on two scans in the main-scanning direction X and four scans in the sub-scanning direction Y).

In this case, conventionally, print data 41 is output to the recording device 14 as print data for recording dots on the recording medium P.

As illustrated in (A) of FIG. 4, the print data 41 is data in which the count of scans is assigned to each pixel included in a unit image T, for each of the unit images T corresponding to the respective recording areas PA. The count of scans indicates in which scan order the pixel is to be recorded. In the print data 41, an integer equal to or greater than one and equal to and smaller than the product M is assigned to each pixel belonging to the unit image T, as the count of scans indicating the scan order for recording.

Furthermore, in the print data 41, a nozzle group for recording a corresponding dot is assigned to each pixel included in the unit image T.

FIG. 5 is an enlarged schematic view of the recording head 16. The plurality of the nozzles 22 arranged in the sub-scanning direction Y on the recording head 16 are divided into and handled as a plurality of nozzle groups S. A unit of the nozzle group S is determined in accordance with the number of scans in the same recording area PA. Specifically, if the number of scans in the single recording area PA is "8", a nozzle array of the nozzles 22 disposed on the recording head 16 is divided by eight in the sub-scanning direction Y so as to be divided into eight nozzle groups S.

Referring back to (A) of FIG. 4, in the print data 41, the nozzle group S on the end of the downstream side YB in the sub-scanning direction Y (also see FIG. 5) is assigned to pixels assigned with the first scan, as a nozzle group S for recording corresponding dots. Furthermore, in the print data 41, the nozzle group S on an end of an upstream side YA in the sub-scanning direction Y (see FIG. 5) is assigned to pixels assigned with the eighth scan, which matches the number of scans in the recording area PA, as a nozzle group S for recording corresponding dots. Thus, different nozzle groups S from the downstream side YB to the upstream side YA in the sub-scanning direction Y are sequentially assigned to pixels assigned with the first scan to the eighth scan.

(B) of FIG. 4 is an explanatory diagram illustrating a relative position of the recording head 16 with respect to the recording medium P when the control unit 25 records dots in accordance with the print data 41.

As illustrated in (B) of FIG. 4, the recording head 16 is moved by a moving amount (by the bandwidth BW) corresponding to the single nozzle group S in the sub-scanning direction Y relative to the recording medium P by each scan. In this case, in the first scan, the nozzle group S on the end of the downstream side YB records dots corresponding to the pixels assigned with the first scan in the recording area PA on the recording medium P. Then, the nozzle groups S on the upstream side YA sequentially record dots corresponding to pixels assigned with subsequent scans, in order from the second to the seventh scans. Then, in the eighth scan that matches the number of scans in the recording area PA, the nozzle group S on the end of the upstream side YA records dots corresponding to the pixels assigned with the eighth scan. Therefore, in the example illustrated in FIG. 4, an image in the recording area PA corresponding to the unit image T is completed by the eight scans (see (B) of FIG. 4 and (C) of FIG. 4).

Then, in the ninth scan, the nozzle group S on the end of the upstream side YA on the recording head 16 records dots corresponding to pixels assigned with the first scan in a next unit image T corresponding to a next recording area PA (see (B) of FIG. 4).

Incidentally, ejection directions or ejection energy of droplets ejected from the plurality of the nozzles 22 arranged in the sub-scanning direction Y on the recording head 16 are not always uniform. In particular, in some cases, ejection characteristics (ejection amounts or ejection directions) of droplets from the nozzles 22 arranged on the end of the upstream side YA and the end of the downstream side YB may be different from desirable characteristics, as compared to the nozzles 22 arranged in the middle in the sub-scanning direction Y.

Specifically, displacement energy that is applied to liquid chambers coupled to the nozzles 22 at the time of droplet ejection is not uniform among the nozzles 22. For example, if the recording head 16 is a piezoelectric type, ejection forces of the nozzles 22 arranged on the end of the upstream side YA and the end of the downstream side YB in the sub-scanning direction Y may be greater than those of the nozzles 22 arranged in the middle in the sub-scanning direction Y. Furthermore, if the recording head 16 is a thermal type, in particular, droplet ejection directions of the nozzles 22 arranged on the end of the upstream side YA and the end of the downstream side YB may be deflected by air flow caused by ejected droplets.

Therefore, if dots are recorded by using the conventional print data 41, in a region Q between the recording areas PA on the recording medium P as illustrated in (D) of FIG. 4, a region recorded by the nozzle group S arranged on the end of the downstream side YB by a single scan for the recording area PA and a region recorded by the nozzle group S arranged on the end of the upstream side YA by a single scan for a next recording area PA are located adjacent to each other in the sub-scanning direction Y.

Therefore, conventionally, in the region Q between the recording areas PA, a difference or deviation of the droplet ejection characteristics between the nozzle group S arranged on the end of the downstream side YB and the nozzle group S arranged on the end of the upstream side YA in the recording head 16 appears as it is as color deviation.

That is, if the recording device 14 performs recording based on the multipath system by using the conventional print data 41, image degradation occurs, so that it is difficult to improve a printing speed and suppress image degradation at the same time.

Therefore, the information processing apparatus 12 of the embodiment generates specific print data.

FIG. 6 is a functional block diagram of the image forming apparatus 10 of the embodiment. The image forming apparatus 10 includes the information processing apparatus 12 and the recording device 14. The information processing apparatus 12 and the recording device 14 are communicably coupled to each other.

The information processing apparatus 12 generates print data to be output to the recording device 14. The information processing apparatus 12 includes a control unit 30. The control unit 30 is a computer including a central processing unit (CPU) or the like, and controls the entire information processing apparatus 12. The control unit 30 may be configured with any device other than a general-purpose CPU. For example, the control unit 30 is configured with a circuit or the like.

The control unit 30 includes an acquiring unit 30A, a calculating unit 30B, a dividing unit 30C, an assigning unit 30D, a changing unit 30E, a generating unit 30F, and an output unit 30G.

A part or all of the acquiring unit 30A, the calculating unit 30B, the dividing unit 30C, the assigning unit 30D, the changing unit 30E, the generating unit 30F, and the output unit 30G may be implemented by, for example, causing a processor, such as a CPU, to execute a program, that is, by software, may be implemented by hardware, such as an integrated circuit (IC), or may be implemented by a combination of software and hardware.

The acquiring unit 30A acquires image data. The image data is image data of an image to be formed by the recording device 14. The acquiring unit 30A may acquire the image data from an external apparatus through a communication line, or may acquire the image data from a storage unit disposed in the information processing apparatus 12.

In the embodiment, a case will be described in which the acquiring unit 30A acquires image data in a raster format. If the acquiring unit 30A acquires image data in a vector format, the format is chanted to the raster format.

The calculating unit 30B calculates, as a reference number N of scans, a sum by adding 1 to the product M of the number m of scans in the main-scanning direction X and the number n of scans in the sub-scanning direction Y that are needed to record an image with the recording target resolution by the recording device 14. Here, N is an integer equal to or greater than 5, m is an integer equal to or greater than 2, and n is an integer equal to or greater than 2.

A resolution of a recording target image may be acquired from an external apparatus, or a resolution specified by a user's operation instruction may be acquired from an operating unit. Furthermore, the resolution of the recording target image may be a resolution determined in advance, or may be described in a header of image data.

The calculating unit 30B calculates the number m of scans in the main-scanning direction X from the resolution of the recording target image and a maximum drive frequency needed to eject droplets from the recording head 16 disposed in the recording device 14. In this case, it is preferable that the calculating unit 30B calculates the minimum number m of scans that can be calculated by the above-described calculation method. Furthermore, in view of improving the printing speed, it is preferable that the number m of scans is "2". The calculating unit 30B acquires the maximum drive frequency of the recording head 16 from the recording device 14 in advance, and uses the maximum drive frequency to calculate the number m of scans in the main-scanning direction X.

Furthermore, the calculating unit 30B calculates the number n of scans in the sub-scanning direction Y needed to record an image with the recording target resolution by the recording device 14, from the pitch of the nozzles 22 in the sub-scanning direction Y on the recording head 16 disposed in the recording device 14. It is preferable that the calculating unit 30B calculates the minimum number n of scans that can be calculated by the above-described calculation method. For example, the calculating unit 30B calculates, as the number n of scans in the sub-scanning direction Y, a quotient by dividing the resolution of the recording target image in the sub-scanning direction Y by the pitch of the nozzles 22 in the sub-scanning direction Y.

The reference number N of scans represents the number of scans in the recording area PA corresponding to the unit image T, which is obtained by dividing an image in the sub-scanning direction Y, on the recording medium P.

That is, conventionally, the above-described product M is used as the number of scans in the recording area PA. In contrast, in the embodiment, the calculating unit 30B calculates a sum of the product M and "1" as the reference number N of scans (may be referred to as the number of multipaths) used as the number of scans in the recording area PA.

The dividing unit 30C divides the image data acquired by the acquiring unit 30A into the unit images T. For example, the dividing unit 30C divides the nozzle array of the plurality of the nozzles 22 arranged in the sub-scanning direction Y on the recording head 16 by the reference number N of scans in the sub-scanning direction Y, and obtains a plurality of the nozzle groups S. Incidentally, the embodiment is not limited to a configuration in which all of the nozzles 22 arranged in the sub-scanning direction Y on the recording head 16 are handled as the object nozzles 22 caused to eject ink. That is, if the number of the nozzles 22 arranged on the recording head 16 (the number of all of the nozzles 22) is not divisible by the reference number N of scans, the indivisible number (that is, the number corresponding to a residue) of the nozzles 22 may be handled as the non-object nozzles 22 that are not caused to eject ink.

As illustrated in FIG. 5, the dividing unit 30C divides the nozzle array of the plurality of the nozzles 22 arranged in the sub-scanning direction Y by the reference number N of scans, thereby obtaining a plurality of the nozzle groups S. If the reference number N of scans is "9", the dividing unit 30C divides the nozzle array of the plurality of the nozzles 22 arranged in the sub-scanning direction Y by 9, thereby dividing the nozzle array into the nine nozzle groups S. That is, the plurality of the nozzles 22 arranged on the recording head 16 are divided into the same number of the nozzle groups S as the reference number N of scans.

In the following description, the nozzle group S located on the end of the downstream side YB in the sub-scanning direction Y may be referred to as a nozzle group S1, and the nozzle group S located on the end of the upstream side YA in the sub-scanning direction Y may be referred to as a nozzle group SN.

The number of the nozzles 22 included in each of the nozzle groups S is determined depending on the number of the nozzles 22 arranged in the sub-scanning direction Y on the recording head 16 and the reference number N of scans. The number of the nozzles 22 included in the nozzle group S may be one or two or more as long as the number is determined by the above-described rule. In the embodiment, the number of the nozzles 22 included in the nozzle group S means the number of the nozzles 22 arranged in the sub-scanning direction Y in the nozzle group S.

In the embodiment, as one example, a configuration will be described in which the nozzle group S includes a plurality of the nozzles 22. Incidentally, the number of the nozzles 22 included in each of the nozzle groups S is the same for all of the nozzle groups S.

Referring back to FIG. 6, the dividing unit 30C divides the image data into a plurality of the unit images T in the sub-scanning direction Y such that each unit image T includes a certain number of pixels whose number in the sub-scanning direction corresponds to the number of the nozzles 22 that are arranged in the sub-scanning direction Y in each of the nozzle groups S.

FIG. 7 is a diagram for explaining generation of print data 44 of the embodiment.

As illustrated in (A) of FIG. 7, the dividing unit 30C divides image data 40 into a plurality of the unit images T.

Referring back to FIG. 6, the assigning unit 30D assigns an integer that is equal to or greater than 1 and equal to or smaller than the product M as the count of scans indicating a scan order for recording to each of pixels belonging to the unit image T, for each of the unit images T of the image data 40. In the embodiment, the assigning unit 30D assigns, as the count of scans indicating the scan order for recording, the integer equal to or greater than 1 and equal to or smaller than the product M such that the number of pixels to be recorded by each scan becomes uniform, to each of the pixels belonging to the unit image T for each of the unit images T of the image data 40.

For example, it is assumed that the product M is "8" (the number m of scans in the main-scanning direction X is 2, and the number n of scans in the sub-scanning direction Y is 4). In this case, the assigning unit 30D assigns an integer from 1 to 8 to each of the pixels belonging to each of the unit images T such that the number of pixels to be recorded by each scan becomes uniform.

For example, as illustrated in (B) of FIG. 7, an integer from 1 to 8 is assigned, as the count of scans, to each of the pixels included in the unit image T.

In the conventional technology, the image data 40 is used as the print data 41. In the embodiment, the control unit 30 changes the count of scans assigned to the image data 40.

Referring back to FIG. 6, the changing unit 30E changes the count of scans of some of pixels to which the first scan is assigned as the count of scans into an N-th scan equal to the reference number of scans, for each of the unit images T of the image data 40 to which the counts of scans are assigned by the assigning unit 30D.

For example, if the product M is "8", the reference number N of scans is "9". In this case, the changing unit 30E changes the count of scans of some of the pixels to which the first scan is assigned into the ninth scan for each of the unit images T.

Specifically, in the unit image T of the image data 40 illustrated in (B) of FIG. 7, the first scan is assigned as the count of scans to four pixels among pixels arranged on the end of the downstream side YB in the sub-scanning direction Y. For example, the changing unit 30E changes the count of scans of two of the four pixels into the ninth scan (see (C) of FIG. 7).

Incidentally, it is sufficient that a percentage of the pixels, for which the count of scans is changed into the N-th scan equal to the reference number of scans (for example, the ninth scan), with respect to the pixels, to which the first scan is assigned among the pixels included in the unit image T, indicates a part of the pixels (that is, equal to or greater than 1% and smaller than 100%), and the percentage of the pixels to be changed is not limited within this range. For example, the percentage of the pixels to be changed is, for example, 50%.

The generating unit 30F generates print data 44 by assigning the nozzle group S for ejecting corresponding dots to each of the pixels of the unit image T of the image data 40 in which the assigned counts of scans are changed by the changing unit 30E (see (C) of FIG. 7).

More specifically, for each of the unit images T, the generating unit 30F sequentially assigns, as the nozzle group S for ejecting dots corresponding to each of the pixels, the nozzle groups S from the nozzle group S1 arranged on the end of the downstream side YB in the sub-scanning direction Y to the nozzle group SN arranged on the end of the upstream side YA in the sub-scanning direction Y, to the pixels from the pixels to which the first scan is assigned as the count of scans to the pixels to which the N-th scan equal to the reference number of scans (for example, the ninth scan) is assigned. Consequently, the generating unit 30F generates the print data 44.

Specifically, the generating unit 30F assigns the nozzle group S1 arranged on the end of the downstream side YB as the nozzle group S for recording dots to the pixels to which the first scan is assigned in each of the unit images T. Furthermore, the generating unit 30F assigns the nozzle groups S from the nozzle group S adjacent to the nozzle group S1 on the upstream side YA to the nozzle group S adjacent to the nozzle group SN on the downstream side YB, to the pixels to which the second scan to an (N−1)-th scan equal to the number N−1 of scans (for example, the second scan to the eighth scan) are assigned. Moreover, the generating unit 30F assigns the nozzle group SN arranged on the end of the upstream side YA as the nozzle group S for recording dots to the pixels to which the N-th scan equal to the reference number of scans (for example, the ninth scan) is assigned.

Therefore, the print data 44 is image data, in which an integer from 1 to the product M is assigned as the count of scans to each of the pixels belonging to the unit image T for each of the unit images T in such a manner that the number of pixels to be recorded by each scan becomes uniform. Furthermore, the print data 44 is image data, in which the count of scans of some of the pixels to which the first scan is assigned as the count of scans is changed into the N-th scan equal to the reference number of scans, for each of the unit images T. Moreover, the print data 44 is image data, in which, for each of the unit images T, the nozzle group S1 arranged on the end of the downstream side YB is assigned as the nozzle group S for recording dots to the pixels to which the first scan is assigned, the nozzle groups S on the upstream side YA are sequentially assigned toward the N-th scan equal to the reference number of scans, and the nozzle group SN arranged on the end of the upstream side YA is assigned as the nozzle group S for recording dots for the pixels to which the N-th scan equal to the reference number of scans is assigned.

FIG. 8 is a diagram for explaining image formation performed by the recording device 14 by using the print data 44 of the embodiment.

It is assumed that the generating unit 30F generates the print data 44 illustrated in (A) of FIG. 8. The print data 44 is the same as the print data 44 illustrated in (C) of FIG. 7.

(B) of FIG. 8 is an explanatory diagram illustrating a relative position of the recording head 16 with respect to the recording medium P when the control unit 25 of the recording device 14 records dots in accordance with the print data 44.

As illustrated in (B) of FIG. 8, the recording head 16 is moved by a moving amount (by the bandwidth BW) corresponding to a single nozzle group S in the sub-scanning direction Y by each scan. In this case, in the first scan, the nozzle group S1 on the end of the downstream side YB records dots corresponding to the pixels assigned with the first scan in the recording area PA on the recording medium P. Then, the nozzle groups S on the upstream side YA sequentially record dots corresponding to the pixels assigned with subsequent scans, in order from the second to the eighth scans. Then, in the N-th scan equal to the reference number of scans, the nozzle group SN on the end of the upstream side YA records dots corresponding to the pixels assigned with the ninth scan.

Therefore, when dots are recorded by using the print data 44 of the embodiment, an image in the recording area PA corresponding to the unit image T is completed by the reference number N of scans, which is obtained by adding 1 to the product M that is conventionally used as the number of scans in the recording area PA (see (B) of FIG. 8 and (C) of FIG. 8).

As described above, the print data 44 of the embodiment is image data, in which the count of scans of some of the pixels to which the first scan is assigned as the count of scans is changed into the N-th scan equal to the reference number of scans for each of the unit images T. Therefore, by recording dots by using the print data 44 of the embodiment, the recording device 14 records, by the ninth scan (the N-th scan equal to the reference number of scans), some of the dots corresponding to the pixels that has been recorded by the first scan in the conventional print data 41.

Consequently, by recording dots by using the print data 44 of the embodiment, the recording device 14 distributes some (for example, a rate of ½) of the pixels to be recorded by the nozzle group S1 on the end of the downstream side YB in the first scan into the N-th scan equal to the reference number of scans (for example, the ninth scan), and performs recording in the N-th scan equal to the reference number of scans by using the nozzle group SN on the end of the upstream side YA (see (D) of FIG. 8).

Therefore, some of the pixels to be recorded by the nozzle group S1 on the end of the downstream side YB in the first scan are recorded by the nozzle group SN on the end of the upstream side YA in the N-th scan equal to the reference number of scans (for example, the ninth scan), in each of the unit images T.

Consequently, it is possible to overcome the conventional state that causes color deviation, in which a region recorded by the nozzle group S1 on the end of the downstream side YB by a single scan for the recording area PA and a region recorded by the nozzle group SN on the end of the upstream side YA by a single scan for the recording area PA are located adjacent to each other in the sub-scanning direction Y in a region between the recording areas PA on the recording medium P.

Therefore, in the embodiment, it is possible to record dots by mixing deviation and a difference in the droplet ejection characteristic between the nozzle group S arranged on the end of the downstream side YB and the nozzle group S arranged on the end of the upstream side YA in the recording head 16. As a result, it is possible to suppress color deviation between the recording areas PA.

Furthermore, in the embodiment, it is possible to improve image quality by suppressing color deviation between the recording areas PA, and realize high image quality, which has conventionally led to a large decrease in a printing speed, at a high printing speed.

Conventionally, the number of scans is simply increased in recording using a multipath system in order to improve image quality. Therefore, a printing speed is greatly reduced.

For example, it is assumed to perform a single scan in the main-scanning direction X and a single scan in the sub-scanning direction Y, and record an image with a resolution (hereinafter, referred to as a reference resolution) corresponding to a total number of the scans, that is, one scan (which is obtained by 1×1). In this case, conventionally, to record an image with a resolution twice as high as the reference resolution, it is necessary to set the number of scans in the main-scanning direction X to two and set the number of scans in the sub-scanning direction Y to two, so that the total number of scans becomes four (2×2). Therefore, conventionally, to record the image with the resolution twice as high as the reference resolution, a printing speed is reduced to ¼ relative to a printing speed used to record an image with the reference resolution.

Similarly, conventionally, to record an image with a resolution four times higher than the reference resolution, it is necessary to set the number of scans in the main-scanning direction X to four and set the number of scans in the sub-scanning direction Y to four, so that the total number of scans becomes 16 (4×4). Therefore, conventionally, to record the image with the resolution four times higher than the reference resolution, a printing speed is reduced to ¹⁄₁₆ relative to a printing speed used to record an image with the reference resolution.

That is, conventionally, when the number of scans is increased to improve image quality in recording using the multipath system, the printing speed (productivity) is greatly reduced in multiples of two. In other words, conventionally, to perform recording with image quality increased by one level in recording using the multipath system, the printing speed is reduced to at least ½.

In contrast, in the embodiment, as described above, it is possible to improve image quality by suppressing color deviation between the recording areas PA, and realize high quality, which has conventionally led to a large decrease in a printing speed, at a high printing speed.

That is, the reference number N of scans used in the embodiment is the number of scans obtained by adding 1 to the number of scans (the product M) needed to record an image with the recording target resolution. For example, if the product M is "8", the reference number N of scans is "9". Therefore, in the embodiment, an image is recorded by performing nine scans in the recording area PA, but the number of the nozzles 22 that record dots in the ninth scan (the N-th scan equal to the reference number of scans) is, at a maximum, only ⅑ (that is, 1/N) of the total number of the object nozzles 22 that are caused to eject ink on the recording head 16.

Therefore, the number of the available nozzles 22 is substantially reduced by about ⅑ (that is, 1/N), so that the printing speed (productivity) is reduced by about 10% as compared to a case where an image is recorded by eight scans (the product M) in the recording area PA. However, as described above, conventionally, when the number of scans is increased to improve image quality in recording using the multipath system, the printing speed (productivity) is greatly reduced in multiples of two. Therefore, in the embodiment, it is possible to greatly improve the printing speed as compared to the conventional embodiment in which the number of scans is simply increased, and it is possible to record an image with a high resolution that has conventionally been achieved by greatly reducing the printing speed to ¼, ¹⁄₁₆, or the like.

That is, by recording dots by the recording device 14 by using the print data 44 generated by the information processing apparatus 12 of the embodiment, it is possible to improve the printing speed and suppress image degradation at the same time. In other words, in the embodiment, it is possible to minimize a reduction in the printing speed (productivity) and suppress image degradation.

The changing unit 30E does not change the count of scans assigned by the assigning unit 30D for pixels to which the nozzle group S (for example, the nozzle group S in the middle in the sub-scanning direction Y) other than the nozzle group SN on the end of the upstream side YA and the nozzle group S1 on the end of the downstream side YB is assigned as the nozzle group S for recording a corresponding dot, among pixels included in the unit image T.

The changing unit 30E may change the count of scans of the pixels to which the first scan is assigned as the count of scans into the N-th scan equal to the reference number of scans, at an equal rate from the upstream side YA to the downstream side YB in the sub-scanning direction Y, with respect to each pixel array including a plurality of pixels arranged in the main-scanning direction X in the unit image T, for each of the unit images T.

FIG. 9 is a diagram for explaining image formation performed by the recording device 14 by using the print data 44 of the embodiment. In FIG. 9, black circles (●) indicate pixels recorded in the first scan (see the recording head 16 on the left side in FIG. 9) and the ninth scan (see the recording head 16 on the right side in FIG. 9). Furthermore, in FIG. 9, white circles (○) indicate pixels that are not recorded in the first scan (see the recording head 16 on the left side in FIG. 9) and the ninth scan (see the recording head 16 on the right side in FIG. 9).

As described above, it is assumed that the count of scans of the pixels to which the first scan is assigned as the count of scans is changed into the N-th scan equal to the reference number of scans in the image data 40 at an equal rate from the upstream side YA to the downstream side YB in the sub-scanning direction Y. In this case, by recording dots by using the print data 44, the recording device 14 can record some of the pixels that are to be recorded by the nozzle group S1 in the first scan, by using the nozzle group SN in the N-th scan equal to the reference number of scans (for example, the ninth scan) at an equal rate in the sub-scanning direction Y.

It is preferable that the changing unit 30E changes the count of scans such that the percentage at which the count of scans of the pixels to which the first scan is assigned as the count of scans is changed into the N-th scan equal to the reference number of scans is increased from the upstream side YA to the downstream side YB in the sub-scanning direction Y, with respect to each pixel array including a plurality of pixels arranged in the main-scanning direction X in the unit image T, for each of the unit images T.

That is, the changing unit 30E increases the percentage at which the count of scans is changed into the N-th scan equal to the reference number of scans for pixels to be recorded by the nozzles 22 located closer to the end of the downstream side YB among the pixels to which the first scan is assigned as the count of scans.

Therefore, in the print data 44, a percentage at which the first scan is continuously assigned (no change) is increased for pixels to be recorded by the nozzles 22 located further from the end of the downstream side YB (the nozzles 22 located closer to the upstream side YA) among the pixels to which the first scan is assigned as the count of scans.

FIG. 10 is a diagram for explaining image formation performed by the recording device 14 by using the print data 44 of the embodiment. In FIG. 10, black circles (●) indicate pixels recorded in the first scan (see the recording head 16 on the left side in FIG. 10) and the ninth scan (see the recording head 16 on the right side in FIG. 10). Furthermore, in FIG. 10, white circles (○) indicate pixels that are not recorded in the first scan (see the recording head 16 on the left side in FIG. 10) and the ninth scan (see the recording head 16 on the right side in FIG. 10).

As described above, it is assumed that the count of scans is changed such that the percentage at which the count of scans of the pixels to which the first scan is assigned as the count of scans is changed into the N-th scan equal to the reference number of scans is increased from the upstream side YA to the downstream side YB in the sub-scanning direction Y, with respect to each pixel array including a plurality of pixels arranged in the main-scanning direction X in the unit image T of the image data 40. In this case, by recording dots by using the print data 44, in the first scan, the recording device 14 records dots corresponding to a smaller number of pixels located closer to the end of the downstream side YB of the recording head 16 and records dots corresponding to a greater number of pixels located closer to the end of the upstream side YA in the recording area PA, by using the nozzle group S1 on the end of the downstream side YB. Furthermore, in the N-th scan equal to the reference number of scans (for example, the ninth scan), the recording device 14 records dots corresponding to a smaller number of pixels located closer to the end portion of the upstream side YA of the recording head 16 and records dots corresponding to a greater number of pixels located closer to the downstream side YB, by using the nozzle group SN on the end of the upstream side YA.

Therefore, in each of the first scan and the N-th scan equal to the reference number of scans, it is possible to suppress recording of dots by the nozzles 22 located closer to the end in each of the sub-scanning direction Y and the opposite sub-scanning direction −Y on the recording head 16. Therefore, it is possible to further suppress image degradation.

Incidentally, it is sufficient that, among the pixel arrays of a plurality of pixels arranged in the main-scanning direction X in the unit image T of the image data 40, the number of pixel arrays in the sub-scanning direction Y for changing the count of scans of the pixels to which the first scan is assigned as the count of scans into the N-th scan equal to the reference number of scans is equal to or greater than one and equal to or smaller than the number corresponding to the nozzle groups S, and not specifically limited within this range. The number of the pixel arrays corresponding to the nozzle group S is equal to the number of the nozzles 22 arranged in the sub-scanning direction Y in the nozzle group S. In other words, the number of the pixel arrays corresponding to the nozzle group S is equal to the moving amount (the bandwidth BW) corresponding to a single scan in the sub-scanning direction Y.

The changing unit 30E may change the count of scans of some of the pixels to which the first scan is assigned as the count of scans into the N-th scan equal to the reference number of scans for each of the unit images T such that a first pixel pattern of the pixels to which the first scan is assigned as the count of scans and a second pixel pattern of the pixels to which the N-th scan equal to the reference number of scans is assigned as the count of scans have regular distribution characteristics or irregular distribution characteristics.

The regular distribution characteristic indicates a regular distribution. For example, the regular distribution characteristic is a pattern represented by a design in which a checkered pattern, an oblique line, or a polygonal shape such as a hexagonal shape or an octagon shape is regularly arranged. The irregular distribution characteristic indicates an irregular distribution. For example, the irregular distribution characteristic is an irregular pattern represented by a frequency modulation (FM) mask pattern, blue noise, random noise, or the like.

If the first pixel pattern and the second pixel pattern indicate the regular distribution characteristics, it is possible to approximately equalize the drive frequency needed to eject droplets from the recording head 16 between the first scan and the N-th scan equal to the reference number of scans. Therefore, it is possible to ensure stable droplet ejection.

Furthermore, if the first pixel pattern and the second pixel pattern indicate the irregular distribution characteristics, it is possible to obtain an asynchronous state with respect to ejection variations in the sub-scanning direction Y and the main-scanning direction X caused by the recording head 16. Therefore, it is possible to reduce color deviation due to a mechanical configuration of the recording head 16.

Next, the flow of information processing performed by the information processing apparatus 12 of the embodiment will be described. FIG. 11 is a flowchart illustrating the flow of the information processing performed by the information processing apparatus 12.

First, the acquiring unit 30A acquires image data (Step S100). Then, the calculating unit 30B calculates, as the reference number N of scans, a sum by adding 1 to the product M of the number m of scans in the main-scanning direction X (m is an integer equal to or greater than 2) and the number n of scans in the sub-scanning direction Y (n is an integer equal to or greater than 2) that are needed to record an image with the recording target resolution (Step S102).

Subsequently, the dividing unit 30C divides the image data acquired at Step S100 into the unit images T (Step S104). Then, the assigning unit 30D assigns an integer equal to or greater than 1 and equal to or smaller than the product M to each of the pixels belonging to the unit image T, as the count of scans indicating the scan order for recording, in such a manner that the number of pixels to be recorded by each scan becomes uniform, for each of the unit images T of the image data acquired at Step S100 (Step S106).

Then, the changing unit 30E changes the count of scans of some of the pixels to which the first scan is assigned as the count of scans into the N-th scan equal to the reference number of scans, for each of the unit images (Step S108). The generating unit 30F generates the print data 44 (Step S110).

Subsequently, the output unit 30G outputs the generated print data 44 to the recording device 14 (Step S112). Upon receiving the print data 44, the recording device 14 records dots on the recording medium P by using the print data 44 to form an image. Then, the routine is finished.

The generating unit 30F may store the print data 44 generated at Step S108 in the storage unit. Then, the recording device 14 may acquire the print data 44 from the information processing apparatus 12 through a communication line or from the storage unit, and use the print data 44 to record dots.

In the embodiment, an example has been described in which the number m of scans in the main-scanning direction X is "2" and the number n of scans in the sub-scanning direction Y is "4", which are needed to record an image with the recording target resolution by the recording device 14. Therefore, it has been explained that the product M is "8" and the reference number N of scans is "9". However, the number m of scans and the number n of scans are not limited to these values, and may be appropriately determined depending on the recording target resolution, the pitch of the nozzles 22 of the recording device 14 in the sub-scanning direction Y, and the maximum drive frequency needed to eject droplets by the recording head 16.

Furthermore, in the embodiment, it has been explained that the print data 44 defines "ejection" or "non ejection" of a droplet for recording dots corresponding to each pixel. However, it may be possible to define the size of a dot (an ejection amount of droplets).

As described above, the information processing apparatus 12 according to the embodiment includes the acquiring unit 30A, the calculating unit 30B, the dividing unit 30C, the assigning unit 30D, the changing unit 30E, and the generating unit 30F. The acquiring unit 30A acquires image data of an image to be formed by the recording device 14. The recording device 14 includes the recording head 16, the sub-scanning unit 18, and the main-scanning unit 20. The recording head 16 includes a plurality of the nozzles 22 that are arranged in the sub-scanning direction Y and that eject droplets to record dots. The sub-scanning unit 18 causes the recording head 16 to scan in the sub-scanning direction Y relative to the recording medium P. The main-scanning unit 20 causes the recording head 16 to scan in a reciprocating manner in the main-scanning direction X crossing the sub-scanning direction Y. The recording device 14 alternately repeats a scan in the main-scanning direction X and a scan in the sub-scanning direction Y when recording dots.

The calculating unit 30B calculates, as the reference number N of scans (N is an integer equal to or greater than 5) in the recording area PA on the recording medium P corresponding to the unit image T that is obtained by dividing the image in the sub-scanning direction Y, a sum by adding 1 to the product M of the number m of scans in the main-scanning direction X (m is an integer equal to or greater than 2) and the number n of scans in the sub-scanning direction Y (n is an integer equal to or greater than 2) that are needed to record an image with the recording target resolution. The dividing unit 30C divides the image data into a plurality of the unit images T in the sub-scanning direction Y such that each unit image T includes a certain number of pixels whose number in the sub-scanning direction Y corresponds to the number of nozzles that are arranged in the sub-scanning direction Y in each of nozzles groups S. The nozzle groups S are obtained by dividing a nozzle array of a plurality of the nozzles arranged in the sub-scanning direction Y.

The assigning unit 30D assigns, as the count of scans indicating the scan order for recording, an integer equal to or greater than 1 and equal to or smaller than the product M such that the number of pixels to be recorded by each scan becomes uniform, to each of the pixels belonging to the unit image T for each of the unit images T. The changing unit 30E changes the count of scans of some of the pixels to which the first scan is assigned as the count of scans into the N-th scan equal to the reference number of scans, for each of the unit images T. The generating unit 30F generates the print data 44, in which the nozzle groups S from the nozzle group S1 arranged on the end of the downstream side YB in the sub-scanning direction Y of the recording head 16 to the nozzle group S arranged on the end of the upstream side YA in the sub-scanning direction Y are sequentially assigned, as the nozzle group S for recording dots corresponding to each pixel, to the pixels from the pixels to which the first scan is assigned as the count of scans to the pixels to which the N-th scan equal to the reference number of scans is assigned, for each of the unit images T.

Therefore, the information processing apparatus 12 of the embodiment can generate print data capable of improving the printing speed and suppressing image degradation at the same time.

Furthermore, it is preferable that the nozzle group S includes a plurality of the nozzles 22.

Moreover, the changing unit 30E may change the count of scans such that the percentage at which the count of scans of the pixels to which the first scan is assigned as the count of scans is changed into the N-th scan equal to the reference number of scans is increased from the pixel array located on the upstream side YA in the sub-scanning direction Y to the pixel array located on the downstream side YB, with respect to each pixel array including a plurality of pixels arranged in the main-scanning direction X in the unit image T, for each of the unit images T.

Furthermore, the changing unit 30E may change the count of scans of some of pixels to which the first scan is assigned as the count of scans into the N-th scan equal to the reference number of scans for each of the unit images T such that the first pixel pattern of the pixels to which the first scan is assigned as the count of scans and the second pixel pattern of pixels to which the N-th scan equal to the reference number of scans is assigned as the count of scans have regular distribution characteristics or irregular distribution characteristics.

Moreover, the information processing method of the embodiment includes acquiring image data of an image to be formed by the recording device 14; calculating, as the reference number N of scans (N is an integer equal to or greater than 5) in the recording area PA on the recording medium P corresponding to the unit image T that is obtained by dividing the image in the sub-scanning direction Y, a sum by adding 1 to the product M of the number m of scans in the main-scanning direction X (m is an integer equal to or greater than 2) and the number n of scans in the sub-scanning direction Y (n is an integer equal to or greater than 2) that are needed to record an image with the recording target resolution; dividing the image data into a plurality of the unit images T in the sub-scanning direction Y such that each unit image T includes a certain number of pixels whose number in the sub-scanning direction Y corresponds to the number of the nozzles 22 that are arranged in the sub-scanning direction Y in each of the nozzle groups S that are obtained by dividing the nozzle array of the plurality of the nozzles 22 arranged in the sub-scanning direction Y by the reference number N of scans in the sub-scanning direction Y; assigning, as the count of scans indicating the scan order for recording, an integer equal to or greater than 1 and equal to or smaller than the product M such that the number of pixels to be recorded by each scan becomes uniform, to each of the pixels belonging to the unit image T for each of the unit images T; changing the count of scans of some of the pixels to which the first scan is assigned as the count of scans into the N-th scan equal to the reference number of scans for each of the unit images T; and generating print data, in which the nozzle groups S from the nozzle group S1 arranged on the end of the downstream side YB in the sub-scanning direction Y of the recording head 16 to the nozzle group S arranged on the end of the upstream side YA in the sub-scanning direction Y are sequentially assigned, as the nozzle group S for recording dots corresponding to each pixel, to the pixels from the pixels to which the first is assigned as the count of scans to the pixels to which the N-th scan equal to the reference number of scans is assigned, for each of the unit images T.

Furthermore, a computer program product including a computer-readable medium containing the information processing program of the embodiment causes a computer to execute acquiring image data of an image to be formed by the recording device 14; calculating, as the reference number N of scans (N is an integer equal to or greater than 5) in the recording area PA on the recording medium P corresponding to the unit image T that is obtained by dividing the image in the sub-scanning direction Y, a sum by adding 1 to the product M of the number m of scans in the main-scanning direction X (m is an integer equal to or greater than 2) and the number n of scans in the sub-scanning direction Y (n is an integer equal to or greater than 2) that are needed to record an image with the recording target resolution; dividing the image data into a plurality of the unit images T in the sub-scanning direction Y such that each unit image T includes a certain number of pixels whose number in the sub-scanning direction Y corresponds to the number of the nozzles 22 that are arranged in the sub-scanning direction Y in each of the nozzle groups S that are obtained by dividing the nozzle array of the plurality of the nozzles 22 arranged in the sub-scanning direction Y by the reference number N of scans in the sub-scanning direction Y; assigning, as the count of scans indicating the scan order for recording, an integer equal to or greater than 1 and equal to or smaller than the product M such that the number of pixels to be recorded by each scan becomes uniform, to each of the pixels belonging to the unit image T for each of the unit images T; changing the count of scans of some of the pixels to which the first scan is assigned as the count of scans into the N-th scan equal to the reference number of scans for each of the unit images T; and generating print data, in which the nozzle groups S from the nozzle group S1 arranged on the end of the downstream side YB in the sub-scanning direction Y of the recording head 16 to the nozzle group S arranged on the end of the upstream side YA in the sub-scanning direction Y are sequentially assigned, as the nozzle group S for recording dots corresponding to each pixel, to the pixels from the pixels to which the first is assigned as the count of scans to the pixels to which the N-th scan equal to the reference number of scans is assigned, for each of the unit images T.

Moreover, the image forming apparatus 10 of the embodiment includes the recording device 14 and the information processing apparatus 12 as described above.

A hardware configuration of the information processing apparatus 12 and the recording device 14 of the embodiment will be described below.

FIG. 12 is a hardware configuration diagram of the information processing apparatus 12 and the recording device 14. The information processing apparatus 12 and the recording device 14 include a CPU 902, a read only memory (ROM) 904, a random access memory (RAM) 906, a hard disk drive (HDD) 908, and an interface (I/F) 912. The CPU 902, the ROM 904, the RAM 906, the HDD 908, and the I/F 912 are coupled to one another via a bus 922, and has a hardware configuration using a normal computer.

A program for executing the processes performed by the information processing apparatus 12 and the recording device 14 of the embodiment is provided by being incorporated in a ROM or the like in advance.

The program for executing the processes performed by the information processing apparatus 12 and the recording device 14 of the embodiment may be provided by being recorded in a computer-readable medium, such as a compact disc-read only memory (CD-ROM), a flexible disk (FD), a compact disc-recordable (CD-R), or a digital versatile disk (DVD) in a format installable and executable by the devices.

Furthermore, the program for executing the processes performed by the information processing apparatus 12 and the recording device 14 of the embodiment may be stored in a computer coupled to a network, such as the Internet, and provided by being downloaded through the network. Moreover, the program for executing the processes performed by the information processing apparatus 12 and the recording device 14 of the embodiment may be provided or distributed through a network, such as the Internet.

The program for executing the processes performed by the information processing apparatus 12 and the recording device 14 of the embodiment has a module structure including the above-described units. As actual hardware, the CPU reads each program from a storage medium, such as a ROM and executes the program, so that the above-described units are loaded on the main storage device and generated on the main storage device.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

REFERENCE SIGNS LIST

10 Image forming apparatus
12 Information processing apparatus
14 Recording device
16 Recording head
18 Sub-scanning unit
20 Main-scanning unit
30A Acquiring unit
30B Calculating unit
30C Dividing unit
30D Assigning unit
30E Changing unit
30F Generating unit
30G Output unit

CITATION LIST

Patent Literature

PTL 1: Japanese Patent Application Laid-open No. 2014-156063

The invention claimed is:

1. An information processing apparatus comprising:
an acquiring unit configured to acquire image data of an image to be formed by a recording device,
the recording device including:
a recording head including a plurality of nozzles that are arranged in a sub-scanning direction and that eject droplets to record dots;
a sub-scanning unit that causes the recording head to scan in the sub-scanning direction relative to a recording medium; and
a main-scanning unit that causes the recording head to scan in a reciprocating manner in a main-scanning direction crossing the sub-scanning direction,
the recording device alternately repeating a scan in the main-scanning direction and a scan in the sub-scanning direction when recording the dots;
a calculating unit configured to calculate, as a reference number N of scans in a recording area on the recording medium corresponding to a unit image that is obtained by dividing the image in the sub-scanning direction, a sum by adding 1 to a product M of a number m of scans in the main-scanning direction and a number n of scans in the sub-scanning direction that are needed to record the image with a recording target resolution, where N is an integer equal to or greater than 5, m is an integer equal to or greater than 2, and n is an integer equal to or greater than 2;
a dividing unit configured to divide the image data into a plurality of unit images in the sub-scanning direction such that each unit image includes a certain number of pixels whose number in the sub-scanning direction corresponds to the number of the nozzles that are arranged in the sub-scanning direction in each of nozzle groups, the nozzle groups being obtained by dividing a nozzle array of a plurality of the nozzles arranged in the sub-scanning direction by the reference number N of scans in the sub-scanning direction;
an assigning unit configured to assign, as a count of scans indicating a scan order for recording, an integer equal to or greater than 1 and equal to or smaller than the product M to each of pixels belonging to the unit image for each of the unit images;
a changing unit configured to change the count of scans of some of pixels to which a first scan is assigned as the count of scans to an N-th scan equal to the reference number of scans, for each of the unit images; and
a generating unit configured to generate print data, in which nozzle groups from a nozzle group arranged on an end of a downstream side in the sub-scanning direction of the recording head to a nozzle group arranged on an end of an upstream side in the sub-scanning direction are sequentially assigned, as the nozzle group for recording dots corresponding to each pixel, to pixels from the pixels to which the first scan is assigned as the count of scans to the pixels to which the N-th scan equal to the reference number of scans is assigned, for each of the unit images.

2. The information processing apparatus according to claim 1, wherein the nozzle group includes a plurality of nozzles.

3. The information processing apparatus according to claim 2, wherein
the changing unit configured to change the count of scans such that a percentage at which the count of scans of the pixels to which the first scan is assigned as the count of scans is changed into the N-th scan equal to the reference number of scans is increased from the pixel array located on the upstream side in the sub-scanning direction to the pixel array located on the downstream side, with respect to each pixel array including a plurality of pixels arranged in the main-scanning direction in the unit image, for each of the unit images.

4. The information processing apparatus according to claim 1, wherein
the changing unit changes the count of scans of some of pixels to which the first scan is assigned as the count of scans into the N-th scan equal to the reference number of scans for each of the unit images T such that a first pixel pattern of the pixels to which the first scan is assigned as the count of scans and a second pixel pattern of pixels to which the N-th scan equal to the reference number of scans is assigned as the count of scans have regular distribution characteristics or irregular distribution characteristics.

5. An information processing method comprising:
acquiring image data of an image to be formed by a recording device,
the recording device including:
a recording head including a plurality of nozzles that are arranged in a sub-scanning direction and that eject droplets to record dots;
a sub-scanning unit that causes the recording head to scan in the sub-scanning direction relative to a recording medium; and
a main-scanning unit that causes the recording head to scan in a reciprocating manner in a main-scanning direction crossing the sub-scanning direction, wherein
the recording device alternately repeating a scan in the main-scanning direction and a scan in the sub-scanning direction when recording the dots;
calculating, as a reference number N of scans in a recording area on the recording medium corresponding to a unit image that is obtained by dividing the image in the sub-scanning direction, a sum by adding 1 to a product M of a number m of scans in the main-scanning direction and a number n of scans in the sub-scanning direction that are needed to record the image with a recording target resolution, where N is an integer equal to or greater than 5, m is an integer equal to or greater than 2, and n is an integer equal to or greater than 2;
dividing the image data into a plurality of unit images in the sub-scanning direction such that each unit image includes a certain number of pixels whose number in the sub-scanning direction corresponds to the number of the nozzles that are arranged in the sub-scanning direction in each of nozzle groups, the nozzle groups being obtained by dividing a nozzle array of a plurality of the nozzles arranged in the sub-scanning direction by the reference number N of scans in the sub-scanning direction;
assigning, as a count of scans indicating a scan order for recording, an integer equal to or greater than 1 and equal to or smaller than the product M to each of pixels belonging to the unit image for each of the units images;
changing the count of scans of some of pixels to which a first scan is assigned as the count of scans to an N-th scan equal to the reference number of scans, for each of the unit images; and
generating print data, in which nozzle groups from a nozzle group arranged on an end of a downstream side in the sub-scanning direction of the recording head to a nozzle group arranged on an end of an upstream side in the sub-scanning direction are sequentially assigned, as the nozzle group for recording dots corresponding to each pixel, to pixels from the pixels to which the first scan is assigned as the count of scans to the pixels to which the N-th scan equal to the reference number of scans is assigned, for each of the unit images.

6. A computer program product comprising a non-transitory computer-readable medium including an information processing program that causes a computer to execute:
acquiring image data of an image to be formed by a recording device,
the recording device including:
a recording head including a plurality of nozzles that are arranged in a sub-scanning direction and that eject droplets to record dots;
a sub-scanning unit that causes the recording head to scan in the sub-scanning direction relative to a recording medium; and
a main-scanning unit that causes the recording head to scan in a reciprocating manner in a main-scanning direction crossing the sub-scanning direction, wherein
the recording device alternately repeating a scan in the main-scanning direction and a scan in the sub-scanning direction when recording the dots;
calculating, as a reference number N of scans in a recording area on the recording medium corresponding to a unit image that is obtained by dividing the image in the sub-scanning direction, a sum by adding 1 to a product M of a number m of scans in the main-scanning direction and a number n of scans in the sub-scanning direction that are needed to record the image with a recording target resolution, where N is an integer equal to or greater than 5, m is an integer equal to or greater than 2, and n is an integer equal to or greater than 2;
dividing the image data into a plurality of unit images in the sub-scanning direction such that each unit image includes a certain number of pixels whose number in the sub-scanning direction corresponds to the number of the nozzles that are arranged in the sub-scanning direction in each of nozzle groups, the nozzle groups being obtained by dividing a nozzle array of a plurality of the nozzles arranged in the sub-scanning direction by the reference number N of scans in the sub-scanning direction;
assigning, as a count of scans indicating a scan order for recording, an integer equal to or greater than 1 and equal to or smaller than the product M to each of pixels belonging to the unit image for each of the units images;
changing the count of scans of some of pixels to which a first scan is assigned as the count of scans to an N-th scan equal to the reference number of scans, for each of the unit images; and
generating print data, in which nozzle groups from a nozzle group arranged on an end of a downstream side in the sub-scanning direction of the recording head to a nozzle group arranged on an end of an upstream side in the sub-scanning direction are sequentially assigned, as the nozzle group for recording dots corresponding to each pixel, to pixels from the pixels to which the first scan is assigned as the count of scans to the pixels to which the N-th scan equal to the reference number of scans is assigned, for each of the unit images.

* * * * *